Dec. 1, 1936. F. MEESE 2,062,422
VALVE AND FAUCET
Filed Jan. 18, 1936
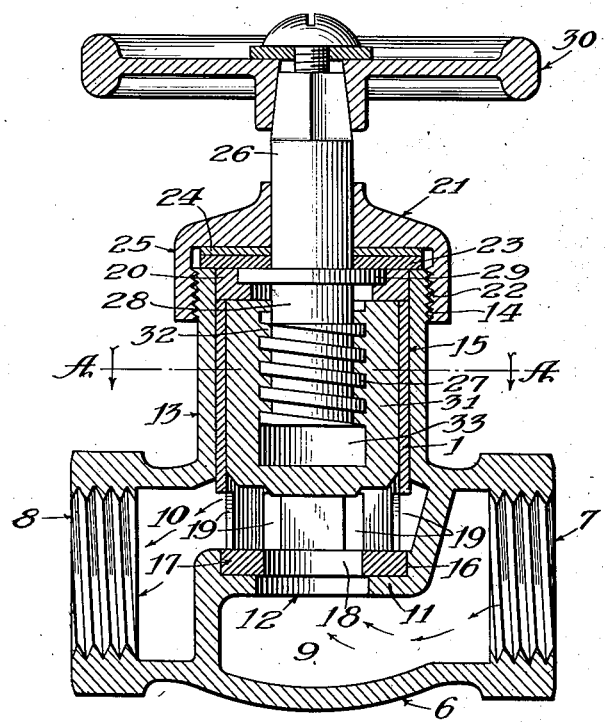
Fig. 4.
Fig. 5.
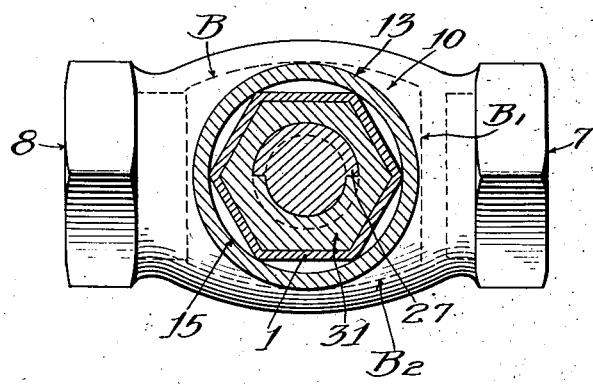
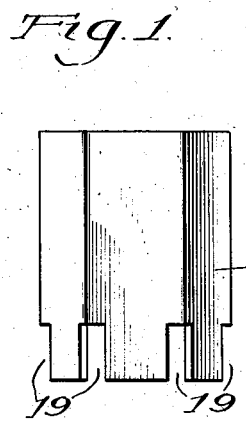
Fig. 1.
Fig. 2.
Fig. 3.
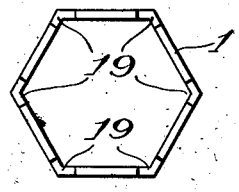
Inventor
Frank Meese Patented Dec. 1, 1936

2,062,422

UNITED STATES PATENT OFFICE 2,062,422

VALVE AND FAUCET

Frank Meese, Chicago, Ill.

Application January 18, 1936, Serial No. 59,773

2 Claims. (Cl. 251—48)

This invention relates to improvements in valves for steam, air, water and other liquids, and faucets for all purposes in the plumbing line, of the type which close against the flow from the inlet.

The object of my invention is to produce a cheap means for holding a removable seat in its place, and to prevent rotation of the valve carrying member and valve when the operating spindle is being turned for closing or opening of a valve to the flow from the inlet, also to guide the said valve carrying member and valve in its movements in the closing and opening of a valve to the flow from the inlet, and also make it possible to use a cheap removable seat that can be easily removed and replaced by a new one upon becoming defective.

To accomplish my object in this invention I use a tubing or sleeve polygonal in shape as described and illustrated in the accompanying drawing. The said sleeve can be made from the regularly manufactured tubing or can be formed in the shape of a tubing or sleeve from sheet metal of a suitable thickness and stiffness for the purpose, or for economy in manufacturing, the sleeve can be formed in two halves separated longitudinally by a plane passing through the center of its diameter, and serving in the same way and for the same purpose as a one piece sleeve.

With the foregoing objects in view the invention consists in the combination and arrangement of parts to be hereinafter fully described, pointed out in the claims and illustrated in the accompanying drawing which forms a part of this application for patent and in which—

Fig. 1 is an elevation of a hexagonal tubing or sleeve.

Fig. 2 is a bottom view of Fig. 1.

Fig. 3 is a bottom view of an octagonal sleeve.

Fig. 4 is a side view of a valve, parts being shown in section.

Fig. 5 is a top view of the valve, parts being in section.

Like reference characters denote corresponding parts throughout the several views.

In Fig. 4, 6 is the body of a valve shown in section, 7 is the inlet, arrows indicate direction of the flow, 8 is the outlet, and which in a faucet would be in the form of a spout, 9 is the inlet chamber, 10 is the outlet chamber, 11 is a partition wall separating the said chambers, 12 is a round orifice through the said partition wall, 13 is a tubular extension to a valve or faucet body, and is for the purpose of housing the operating mechanism, 14 is an external thread at the upper or outer end of the tubular extension, 15 is a longitudinal bore in the said tubular extension, 16 is a recess or an auxiliary seat in the outlet chamber side of the partition wall, the circular wall of the recess being slightly tapered, the upper edge being of the same diameter as the bore of the tubular extension, and the bottom being slightly smaller, 17 is a hard fibre washer shaped removable seat of such diameter as to easily slip through the bore 15 and just enter part way into the recess and then be pushed or pressed in to the bottom, 18 is a round central opening through the said removable seat and of such diameter as to allow the full required flow to pass through, the orifice 12 being a little larger in diameter than the central opening 18 thus leaving a shoulder around the bottom of the central opening 18 by which the removable seat may be taken hold of and pulled out after becoming defective, said central opening 18, the orifice 12 and the circular wall of the recess 16 being concentric with the bore 15, the hexagonal tubing or sleeve, Fig. 1, disposed in the bore of the tubular extension and having a series of suitably spaced rectangular outflow openings 19 at its bottom end, the combined area of said openings being such as to allow the full required flow to pass through; 20 is a collar diametrally fitting into the bore of the tubular extension and is disposed on the outer end of the sleeve, said collar having a suitable central opening and in its top or outer face and surrounding the said central opening a suitable recess, 21 is a cap detachably secured to the end of the tubular extension by an internal thread 22 in the said cap contacting with the external thread 14, 23 is a circular hard fibre disc adjacent the end face of the tubular extension and is of such diameter as to just clear the internal thread 22, and intermediate the fibre disc and the cap is a metal washer 24 for cap to ride on, the outer portion 25 at the bottom of the cap is so shaped as to form a means for applying a wrench, the arrangement being such that the pressure of the cap forces the fibre disc against the end face of the tubular extension sealing it against a leak, and at the same time the removable seat 17, the sleeve 1 and the collar 20 are held tight between the inner face of the fibre disc 23 and the recessed face or auxiliary seat 16, thus the sleeve can not turn. 26 is an operating spindle having a lower or inner externally threaded portion 27, and 28 is an ordinary threading tool clearance; 29 is an annular flange, an upper or outer portion of the spindle being rotatably disposed in a central opening through the fibre disc 23, washer 24 and the cap 21, the recessed face in the collar and the fibre disc preventing lateral movement of the flange and spindle, a suitable handle 30 being suitably attached to the outer end of the spindle, 31 is a hexagonal barrel slideably disposed in the sleeve, the inner end of the barrel facing the removable seat being turned or finished as a valve, 32 is an internal thread in the outer end of the barrel for contacting with and being disposed on the externally threaded portion of the operating spindle, and 33 is an ordinary clearance. By turning the spindle one way the valve is forced tight against the removable seat which in turn is held tight against the auxiliary seat shutting off the flow from the inlet, and on turning spindle the reverse way the valve is drawn away from the seat, the flow coming through the central opening in the seat and going out through the openings 19 into the outlet chamber and out through the outlet, thus it is seen that the removable seat is held tight in its place and the sleeve being held tight is locked against rotatable movement and the valve carrying member being of the same polygonal shape as the sleeve is thereby also prevented from rotating, the sleeve guiding the valve carrying member in a straight line to and from the seat.

The usefulness of this invention can be realized from the fact that the barrel and valve being made from hexagonal rolled or drawn bar stock is free from blow holes or pin holes and will last an indefinite length of time, thus being relatively cheap for the length of useful service, the removable seat is cheap to make and easy to replace, and the sleeve also is cheap and easy to make, all parts can be manufactured interchangeable and repairs can be made without disconnecting the body from the piping. Also the removable seat and the valve can be designed and made of a metal or material suitable for any purpose a valve or faucet may be wanted for, as for instance the removable seat may be made of rolled or drawn bar metal and a fibre washer used as a seal or packing between the said removable seat and the auxiliary seat, and the barrel made so that a washer shaped fibre valve can be fastened to it by a holding screw, or both removable seat and the valve may be made from bar metal and the faces ground or lapped to each other.

In Fig. 5 the tubular extension is shown in section as on line A—A Fig. 4. The dotted lines B, B1 and B2 represent the outline of the outlet chamber showing ample room for egress to the flow coming through the openings 19.

The octagonal sleeve Fig. 3 also has a series of outflow openings 19, and is used in the same way and for the same purpose as the hexagonal sleeve Fig. 1, the valve carrying barrel being octagonal when an octagonal sleeve is used.

Having thus fully described my invention, what I claim as new and desire to secure by Letters Patent is:

1. In a valve or faucet body with inlet and outlet openings, inlet and outlet chambers, a partition wall separating the said chambers, an orifice through the said partition wall, said body having a tubular extension and a longitudinal bore therein and in direct communication with the outlet chamber, the said chamber being larger than the said bore, a recess in the outlet chamber side of the partition wall, the said recess forming an auxiliary seat, a suitable removable seat located in the said recess, a sleeve of a suitable polygonal shape disposed in the bore of the tubular extension, the inner end bearing on the removable seat and having a means for egress to the outgoing flow through the wall of the sleeve into the outlet chamber and the outlet, a collar also disposed in the bore of the tubular extension and bearing on the outer end of the sleeve, the said collar preventing inward movement of an operating spindle rotatably disposed through a cap, and having a handle attached to its outer end, and having an externally threaded inner end, and a means including said collar for preventing lateral or longitudinal movement of the spindle, a means for sealing the open end of the tubular extension, and the cap disposed over the said means and detachably secured to the end of the tubular extension, the pressure of the cap acting on the collar, the sleeve, and the removable seat, thus holding the removable seat tight to the auxiliary seat, and the sleeve locked against rotatable movement, a nonrotatable valve carrying member slideably disposed in the sleeve and having a suitable valve on its inner end, and in its outer end an internal thread in engagement with the externally threaded portion of the spindle, the orifice in the partition wall, a central opening in the removable seat, and the circular wall of the auxiliary seat, the valve, the internal thread in the valve carrying member and the spindle being in line and concentric with the bore of the tubular extension, the sleeve guiding the valve carrying member and valve in a straight line in its movements to and away from the valve seat in closing and opening to the flow from the inlet.

2. In a valve or faucet a polygonal sleeve, made in two halves separated longitudinally by a plane passing through the center of the diameter of the sleeve, and having through its wall at one end a series of suitable outflow openings, the sleeve being for the purpose of holding a removable seat tight in its place, and to prevent rotatable movement of the valve carrying member and valve, also to guide said valve carrying member and valve in a straight line in its movements to and away from the seat in closing and opening to the flow from the inlet in a valve or faucet comprising a body having inlet and outlet openings, inlet and outlet chambers, a partition wall separating the said chambers, an orifice through the said partition wall, a tubular extension to the said body, a longitudinal bore therein for housing the operating mechanism, the said bore being in direct communication with the outlet chamber, and the said outlet chamber being larger than the said bore, a suitable recess in the outlet chamber side of the partition wall, the recess forming an auxiliary seat, a suitable removable seat located in the said recess, the sleeve being disposed in the bore of the tubular extension, the inner end thereof having a series of outflow openings and bearing on the removable seat, a collar also disposed in the tubular extension and bearing on the outer end of the sleeve, the said collar preventing inward movement of an operating spindle rotatably disposed through a cap, and having a handle attached to its outer end, and having an externally threaded inner end, and a means including said collar for preventing longitudinal movement of the spindle, a means for sealing the open end of the tubular extension, the said cap being disposed over the said means and detachably secured to the end of the tubular extension, a nonrotatable valve carrying barrel slideably disposed in the sleeve, a suitable valve on the inner end of the said barrel, and in its outer end an internal thread in engagement with the externally threaded portion of the operating spindle, the pressure of the cap acting on the collar, the sleeve and the removable seat, thus holding the removable seat tight against the auxiliary seat, and holding the sleeve locked against rotatable movement, said sleeve in turn preventing rotatable movement of the valve carrying barrel and the valve, also guiding the said barrel in its movements to and away from the removable seat in the closing and opening of the valve to the flow from the inlet.

FRANK MEESE.